(12) United States Patent
Elliot et al.

(10) Patent No.: US 10,701,538 B1
(45) Date of Patent: Jun. 30, 2020

(54) SMART CONNECTION MANAGEMENT (71) Applicant: BOSE CORPORATION, Framingham, MA (US)

(72) Inventors: Michael Elliot, North Grafton, MA (US); Pankaj Aggarwal, Ashland, MA (US); Mark Corey Hatch, Brighton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/544,697

(22) Filed: Aug. 19, 2019

(51) Int. Cl.
| | | |
|---|---|---|
| *H04W 4/80* | (2018.01) | |
| *H04B 1/00* | (2006.01) | |
| *H04W 72/04* | (2009.01) | |
| *H04R 3/12* | (2006.01) | |
| *H04W 72/02* | (2009.01) | |

(52) U.S. Cl.
CPC ............. *H04W 4/80* (2018.02); *H04R 3/12* (2013.01); *H04W 72/02* (2013.01); *H04W 72/0453* (2013.01); *H04R 2420/07* (2013.01)

(58) Field of Classification Search
CPC ........ H04W 4/80; H04W 72/02; H04B 1/005; H04B 1/56; H04R 3/12; H04R 2420/07
See application file for complete search history.

(56) References Cited

U.S. PATENT DOCUMENTS

| | | | |
|---|---|---|---|
| 2009/0201092 A1* | 8/2009 | Yuan | H03L 7/06 331/2 |
| 2012/0289154 A1* | 11/2012 | Son | H04B 5/0031 455/41.1 |
| 2014/0064212 A1* | 3/2014 | Ko | H04W 4/80 370/329 |
| 2014/0219193 A1* | 8/2014 | Linde | H04W 72/1215 370/329 |
| 2015/0189024 A1* | 7/2015 | Misra | H04L 67/141 709/205 |
| 2016/0142865 A1* | 5/2016 | Park | H04W 4/80 455/41.1 |
| 2017/0019443 A1* | 1/2017 | Conan | H04N 21/43637 |
| 2017/0064619 A1* | 3/2017 | Neelisetty | H04W 16/14 |
| 2018/0116003 A1* | 4/2018 | Gu | H04W 4/70 |
| 2018/0167825 A1* | 6/2018 | Egner | H04W 16/16 |

* cited by examiner

*Primary Examiner* — Andrew Wendell
(74) *Attorney, Agent, or Firm* — Patterson + Sheridan, LLP (57) ABSTRACT

A method is provided for managing a number of active wireless data streams in a device. An operating band of the device is detected, wherein the device is capable of simultaneously supporting Wi-Fi and Bluetooth communications by time sharing the operating band between the Wi-Fi and Bluetooth communications. A request is detected for simultaneously operating in at least two of a Wi-Fi communication mode, a Bluetooth source communication mode, or a Bluetooth sink communication mode. In response to detecting the request, only two of the Wi-Fi communication mode, the Bluetooth source communication mode, or the Bluetooth sink communication mode are selected.

20 Claims, 5 Drawing Sheets

SMART CONNECTION MANAGEMENT

FIELD

Aspects of the disclosure generally relate to managing multiple wireless links, and more specifically to techniques for intelligent detection and selection of wireless links for a given operating band.

BACKGROUND

Audio devices designed for distribution and reproduction of audio are available in several hardware configurations and can use a range of technologies for processing and rendering audio streams and for communicating with other devices including audio input devices and audio output devices. For example, speakers range from Bluetooth® speakers, (Wi-Fi)' speakers, Audio for Video speakers (e.g., sound bars) and speakers that use other communication protocols or a combination of communication protocols. The wide array of device architectures, configurable device network topologies and communication technologies (e.g., Bluetooth, Wi-Fi etc.) used by the various audio devices to communicate with other devices makes interoperation and synchronization between these devices complicated and difficult to coordinate and execute.

SUMMARY

All examples and features mentioned herein can be combined in any technically possible manner.

Aspects of the present disclosure provide a method for managing a number of active wireless data streams in a device. The method generally includes detecting an operating band of the device, wherein the device is capable of simultaneously supporting Wi-Fi and Bluetooth communications by time sharing the operating band between the Wi-Fi and Bluetooth communications; detecting a request for simultaneously operating in at least two of a Wi-Fi communication mode, a Bluetooth source communication mode, or a Bluetooth sink communication mode; and selecting, in response to detecting the request, only two of the Wi-Fi communication mode, the Bluetooth source communication mode, or the Bluetooth sink communication mode.

In an aspect, the method further includes allocating a portion of time for the time sharing for the Wi-Fi communication mode; and allocating a remaining portion of the time for one of the Bluetooth source communication mode or the Bluetooth sink communication mode.

In an aspect, selecting only two of the communication modes includes selecting the Wi-Fi communication mode; and selecting one of the Bluetooth source communication mode and the Bluetooth sink communication mode, wherein at least one of the Bluetooth source communication mode and the Bluetooth sink communication mode is an unselected Bluetooth communication mode.

In an aspect, the method further includes detecting a request for the unselected Bluetooth communication mode.

In an aspect, the method further includes dropping the selected one of the Bluetooth source communication mode and the Bluetooth sink communication mode; and selecting the unselected Bluetooth communication mode.

In an aspect, the method further includes determining whether to drop the selected one of the Bluetooth source communication mode and the Bluetooth sink communication mode based on user preferences.

In an aspect, the method further includes detecting that the Wi-Fi communication has switched to a second operating band, such that all three of the Wi-Fi communication mode, the Bluetooth source communication mode, and the Bluetooth sink communication mode can be simultaneously supported; and in response, selecting all three of the Wi-Fi communication mode, the Bluetooth source communication mode, and the Bluetooth sink communication mode.

In an aspect, the method further includes detecting that the Wi-Fi communication mode is disabled; and in response, selecting both the Bluetooth source communication mode and the Bluetooth sink communication mode.

In an aspect, the operating band is 2.4 gigahertz (GHz).

Aspects of the present disclosure provide an apparatus for managing a number of active wireless data streams in a device. The apparatus generally includes at least one processor generally configured to detect an operating band of the device, wherein the device is capable of simultaneously supporting Wi-Fi and Bluetooth communications by time sharing the operating band between the Wi-Fi and Bluetooth communications; detect a request for simultaneously operating in at least two of a Wi-Fi communication mode, a Bluetooth source communication mode, or a Bluetooth sink communication mode; and select, in response to detecting the request, only two of the Wi-Fi communication mode, the Bluetooth source communication mode, or the Bluetooth sink communication mode.

In an aspect, the at least one processor is further configured to allocate a portion of time for the time sharing for the Wi-Fi communication mode; and allocate a remaining portion of the time for one of the Bluetooth source communication mode or the Bluetooth sink communication mode.

In an aspect, the at least one processor is configured to perform the selecting only two of the communication modes by selecting the Wi-Fi communication mode; and selecting one of the Bluetooth source communication mode and the Bluetooth sink communication mode, wherein at least one of the Bluetooth source communication mode and the Bluetooth sink communication mode is an unselected Bluetooth communication mode.

In an aspect, the at least one processor is further configured to detect a request for the unselected Bluetooth communication mode.

In an aspect, the at least one processor is further configured to drop the selected one of the Bluetooth source communication mode and the Bluetooth sink communication mode; and select the unselected Bluetooth communication mode.

In an aspect, the at least one processor is further configured to determine whether to drop the selected one of the Bluetooth source communication mode and the Bluetooth sink communication mode based on user preferences.

In an aspect, the at least one processor is further configured to detect that the Wi-Fi communication has switched to a second operating band, such that all three of the Wi-Fi communication mode, the Bluetooth source communication mode and the Bluetooth sink communication mode can be simultaneously supported; and in response, select all three of the Wi-Fi communication mode, the Bluetooth source communication mode and the Bluetooth sink communication mode.

In an aspect, the at least one processor is further configured to detect that the Wi-Fi communication mode is disabled; and in response, select both the Bluetooth source communication mode and the Bluetooth sink communication mode.

Aspects of the present disclosure provide a computer-readable medium for managing a number of active wireless data streams in a device, the computer-readable medium storing instructions which when processed by at least one processor performs a method. The method generally includes detecting an operating band of the device, wherein the device is capable of simultaneously supporting Wi-Fi and Bluetooth communications by time sharing the operating band between the Wi-Fi and Bluetooth communications; detecting a request for simultaneously operating in at least two of a Wi-Fi communication mode, a Bluetooth source communication mode, or a Bluetooth sink communication mode; and selecting, in response to detecting the request, only two of the Wi-Fi communication mode, the Bluetooth source communication mode, or the Bluetooth sink communication mode.

In an aspect, the computer-readable further includes instructions for allocating a portion of time for the time sharing for the Wi-Fi communication mode; and allocating a remaining portion of the time for one of the Bluetooth source communication mode and the Bluetooth sink communication mode.

In an aspect, the selecting only two of the communication modes includes selecting the Wi-Fi communication mode; and selecting one of the Bluetooth source communication mode and the Bluetooth sink communication mode, wherein at least one of the Bluetooth source communication mode and the Bluetooth sink communication mode is an unselected Bluetooth communication mode.

DETAILED DESCRIPTION

Figure 1:
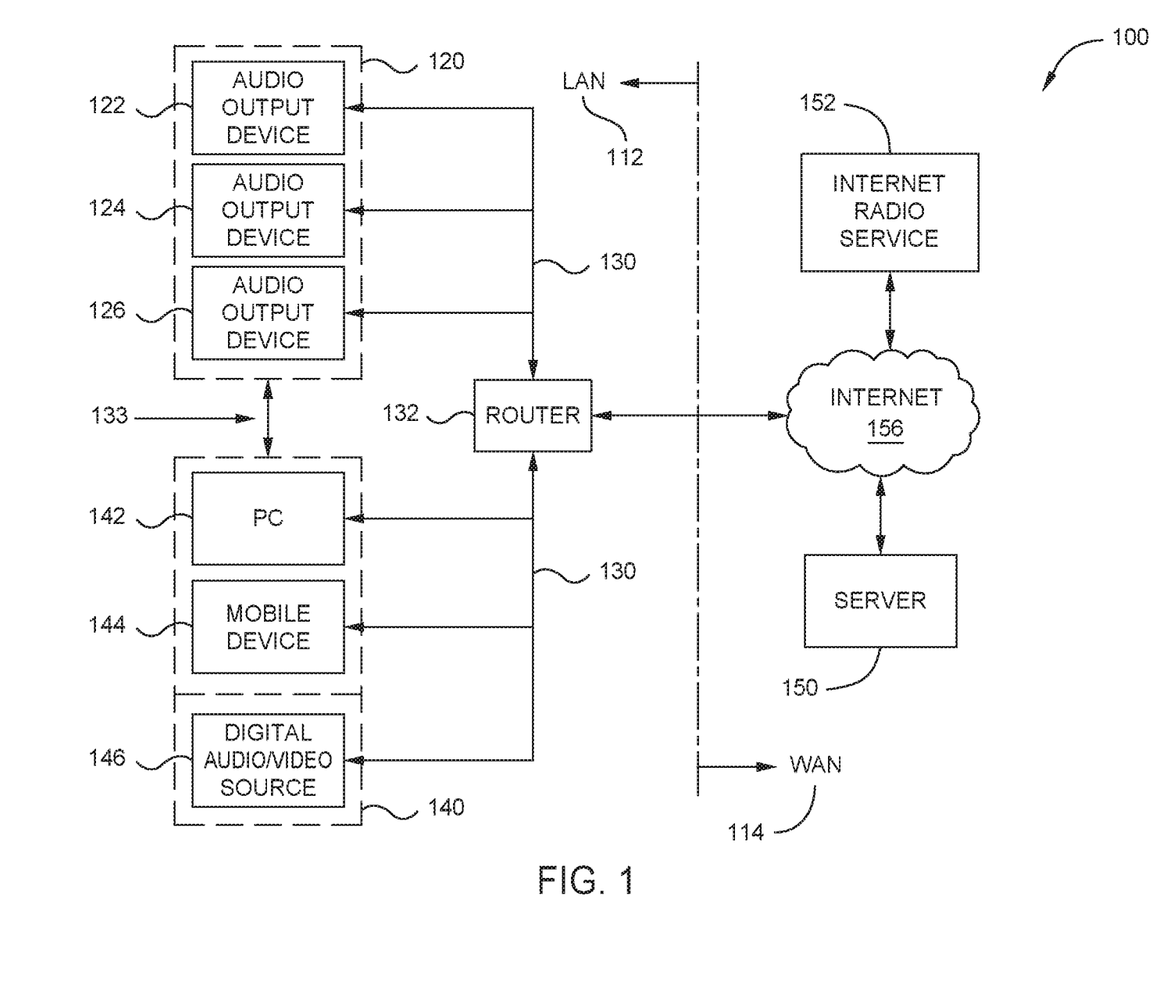
FIG. 1 illustrates an example audio distribution system in which aspects of the present disclosure can be practiced.

Certain devices (e.g., computing devices 140, audio output devices 120 etc. as shown in FIG. 1) support simultaneous Wi-Fi and Bluetooth communications, often referred to as Wi-Fi/Bluetooth coexistence. These devices include audio/video receivers, sound bars, audio speakers and the like. Devices that support Wi-Fi/Bluetooth coexistence generally simultaneously support at least a Wi-Fi communication mode and at least one Bluetooth communication mode at one time. In an aspect, the Bluetooth communication mode may include a Bluetooth sink mode in which the device is configured to receive an audio stream (e.g., A2DP stream) or a Bluetooth source mode in which the device is configured to transmit an audio stream (e.g., A2DP stream). Further, a device may support multiple Bluetooth links in each of the Bluetooth communication modes. For instance, a device may simultaneously transmit an A2DP stream to a Bluetooth headset and to one or more Bluetooth speakers. In this case the device operates two Bluetooth source links simultaneously in the Bluetooth communication mode.

In certain aspects, most commercially available devices include a single Radio Frequency (RF) chain including a single transceiver for receiving and transmitting data, allowing the device to communicate using only one of the supported communication modes (e.g., Wi-Fi or Bluetooth) at one time. A RF chain generally includes a transceiver and other circuitry for transmitting and/or receiving data. A device having a single RF chain generally supports simultaneous communication using multiple communication modes by time sharing its RF chain between each of the communication modes. For example, a device may simultaneously communicate using Wi-Fi and Bluetooth links by timesharing its RF chain between the Wi-Fi and the Bluetooth communication. This means that each of the Wi-Fi and Bluetooth communication modes are allotted particular time intervals according to a time division multiplexing pattern and communication in a particular time interval is carried out using the communication mode allotted for the time interval.

It has been found that when time sharing the different communication modes for a given operating band, a minimum time interval or air time must be allotted to each communication mode to consistently achieve acceptable audio quality and/or latency for the communication mode. Allocating the minimum air time required for a communication mode allows sufficient time for error free communication of audio data (including retransmissions of audio data) between devices. Allocating less than optimal air time for a communication mode can degrade audio quality beyond usability. For example, a system can be configured to provide lower latency as well as smooth playback, which can require a compromise by only allowing certain connectivity options, including allowing only a limited number of links for a given operating band to achieve the lower latency and smooth playback. In certain other use cases, a higher latency can be allowed which in turn can allow increased connectivity options including allowing a higher number of links for a given operating band.

In an aspect, each communication mode can have the same or different minimum required air time for a robust connection between devices. In view of the minimum required air times for the communication modes, a device can simultaneously support only a limited number of communication modes and corresponding links for a given operating band without compromising audio quality of the links. For example, a device that supports Wi-Fi/Bluetooth coexistence can support only a maximum number of links selected from a Wi-Fi link, one or more links when operating in the Bluetooth source mode, and one or more links when operating in the Bluetooth sink mode.

As a result of the limited number of communication modes and corresponding links that can be supported for a given operating band, access to a band must be managed in order to provide the highest level of functionality to the user while ensuring the best user experience. Additionally, the user cannot be allowed to put the system into operational modes that would not provide the intended benefits and not meet user expectations. For instance, the user cannot be allowed to initiate more than the maximum number of communication modes and links that can be reliably handled by a particular device.

In an aspect, the above problem may be solved by separating out the RF chains for different communication modes and corresponding links such that a different RF chain is used for Wi-Fi communication and one or more different RF chains are used for Bluetooth communication depending on how may simultaneous Bluetooth links are to be supported by the device. However, providing multiple RF chains increases device costs and overall size, as additional componentry would be required (e.g., additional chipsets, antennae/radios, etc.).

Certain aspects of the present disclosure discuss techniques for intelligent management of an operating band for a device. These aspects include techniques for intelligently selecting one or more communication modes and corresponding links for the device so as to not exceed a maximum number of communication modes and links that can be reliably supported by the device for the given operating band without compromising audio quality. The techniques described herein provide numerous benefits, as will be apparent. For example, the techniques prevent (or at least help prevent) a device from entering a connectivity state that would not meet performance expectations. As another example benefit, the techniques can help provide a consistent experience that can be user-configured as desired or required. As yet another example benefit, the techniques can help maximize the use of the 2.4 GHz band based on the operational mode configuration of a device, as will be apparent in light of this disclosure.

FIG. 1 illustrates an example audio distribution system 100 in which aspects of the present disclosure can be practiced.

Audio distribution system 100 includes non-limiting examples of wireless speaker packages and other wireless audio sources and sinks in which aspects of the present disclosure can be implemented. In an aspect, system 100 is adapted to deliver digital audio (e.g., digital music). As shown, system 100 includes a number of audio output devices 122, 124 and 126 which are among a group of audio output devices 120 of the system 100. In an aspect, each of the audio output devices is a wireless speaker package that is able to receive digital audio signals and convert them to analog form. The speaker packages also include an electro-acoustic transducer that receives the analog audio signals and transduces them into sound. The wireless speaker packages also include at least one processor for processing audio data. The group of audio output devices 120 can include speaker packages with different hardware architectures and audio configurations. Further, the speaker packages can support different software/firmware protocols and protocol versions thereof for transport and control of audio flows, and further can support different media file formats (e.g., mp3, mp4 etc.). Further, different speaker packages can support different wired and/or wireless communication technologies (e.g., Bluetooth, Wi-Fi, Apple Airplay®, Apple Airplay® 2 a proprietary protocol stack/suite developed by Apple Inc., with headquarters in Cupertino, Calif., that allows wireless streaming of audio, video, and photos, together with related metadata between devices, etc.) to wirelessly communicate with other speaker packages in the group as well as other devices in the system 100. In an aspect, one or more of the speaker packages can support multiple wired and/or wireless communication technologies and can be configured (e.g., by a user) to communicate with other devices in the system 100 using one or more of the supported communication technologies at one time. For instance, one or more of the speaker packages can support communication with other devices in the system 100 using Wi-Fi and at least one Bluetooth protocol. In an aspect, one or more of the speaker packages that supports both Wi-Fi and Bluetooth communication modes can support simultaneous Wi-Fi and Bluetooth communications at one time in an allotted band of frequencies, often referred to as Wi-Fi/Bluetooth coexistence. For example, a speaker package can receive an audio stream from a smart phone using Bluetooth and can further simultaneously redistribute the audio stream to one or more other speakers over Wi-Fi. In an aspect, one or more of the speaker packages are designed with audio source capabilities in addition to audio sink capabilities. For example, one or more of the speaker packages can be configured as a master speaker of a network of speakers in the system 100, and can receive an audio stream as an audio sink and then further redistribute the audio stream as an audio source to one or more other speakers in the system 100.

System 100 further includes one or more computing devices 140 and/or one or more separate local digital audio/video source devices 146. In this example the computing devices include a personal computer 142 and a mobile computing device 144 such as a smartphone, tablet or the like. In an aspect, the computing devices 140 and the digital audio video devices 146, like the audio output devices, can support different wired and wireless communication technologies (e.g., Bluetooth, Wi-Fi, Apple Airplay®, Apple Airplay® 2 etc.) for communicating with other devices in the system 100 including the audio output devices 120. In an aspect, each of the computing devices 140 and the digital audio/video source devices 146 can support multiple wired and/or wireless communication technologies.

In an aspect, each device in the system 100 that is capable of Wi-Fi communication can be connected to a network 130 via a router/access point 132 and can communicate with other Wi-Fi enabled devices in the system 100 over the network 130 via the router/access point 132. In this example, as shown, the audio output devices from group 120, the computing devices 140 and the digital audio/video source devices 146 are connected to the network 130 via the router/access point 132. In this example, the network 130 is part of a wireless Local Area Network (WLAN) 112 which is connected to a wide area network (WAN) 114 by connection to Internet 156. WAN 114 includes a server 150 and an Internet radio service 152 which can both communicate with LAN 112 via the Internet 156.

In certain aspects, one or more of the computing devices 140 and the digital audio/video source device 146 can be connected to one or more of audio output devices 120 via a personal area network (PAN) 133 (e.g., a wireless PAN). PAN 133 can comprise a direct point-to-point wireless connection (e.g., using Bluetooth, Apple Airplay®, Apple Airplay® 2 or other point to point protocol) between the devices 140/146 and one or more of the audio output devices 122, 124 or 126. In an aspect, one or more of the audio output devices 120 can be capable of communicating with other audio output devices within the group via other wireless communication methods (e.g., other than Wi-Fi) including a point-point communication method such as Bluetooth.

In an aspect, the sources of digital audio including the computing devices 140 and the digital audio/video source device 146 provide access to content such as audio streams that are communicated over network 130 and/or network 133 to the audio output devices. The sources of such audio streams can include, for example, Internet radio stations sourced by an internet radio service such as internet radio service 152 and user defined playlists. Each of such digital audio sources maintains a repository of audio content which can be chosen by the user to be played over one or more of the audio output devices. Such digital audio sources can include Internet-based music services such as Pandora®, Spotify® and TuneIn®, for example. The digital audio/video source device 146 can include a network attached storage device. Media server applications running on the PC 142 and the mobile computing device 144 can be used to access digital content over the internet and source audio data for outputting by one or more audio output devices. Typically, the user selects the audio source and the audio output devices via PC 142 and/or mobile device 144. Note that the present disclosure primarily describes the techniques herein in the context of transferring audio data, for ease of description. However, in at least some implementations, the techniques described herein equally apply to the distribution of any media data, which can include video, audio, and/or image data. For instance, digital media sources can include Internet-based content services such as Netflix®, Hulu® and Amazon's Prime Video, for example.

In certain aspects, one or more of the computing devices 140 including the PC 142 and/or the mobile device 144 can be used as a control entity for managing creation and control of speaker groups for synchronized audio output. For example, a software application accessible via the PC 142 or the mobile device 144 can be operated by a user to create new speaker groups or manage existing speaker groups for playback of synchronized audio by the speakers in a created group of speakers.

Figure 2:
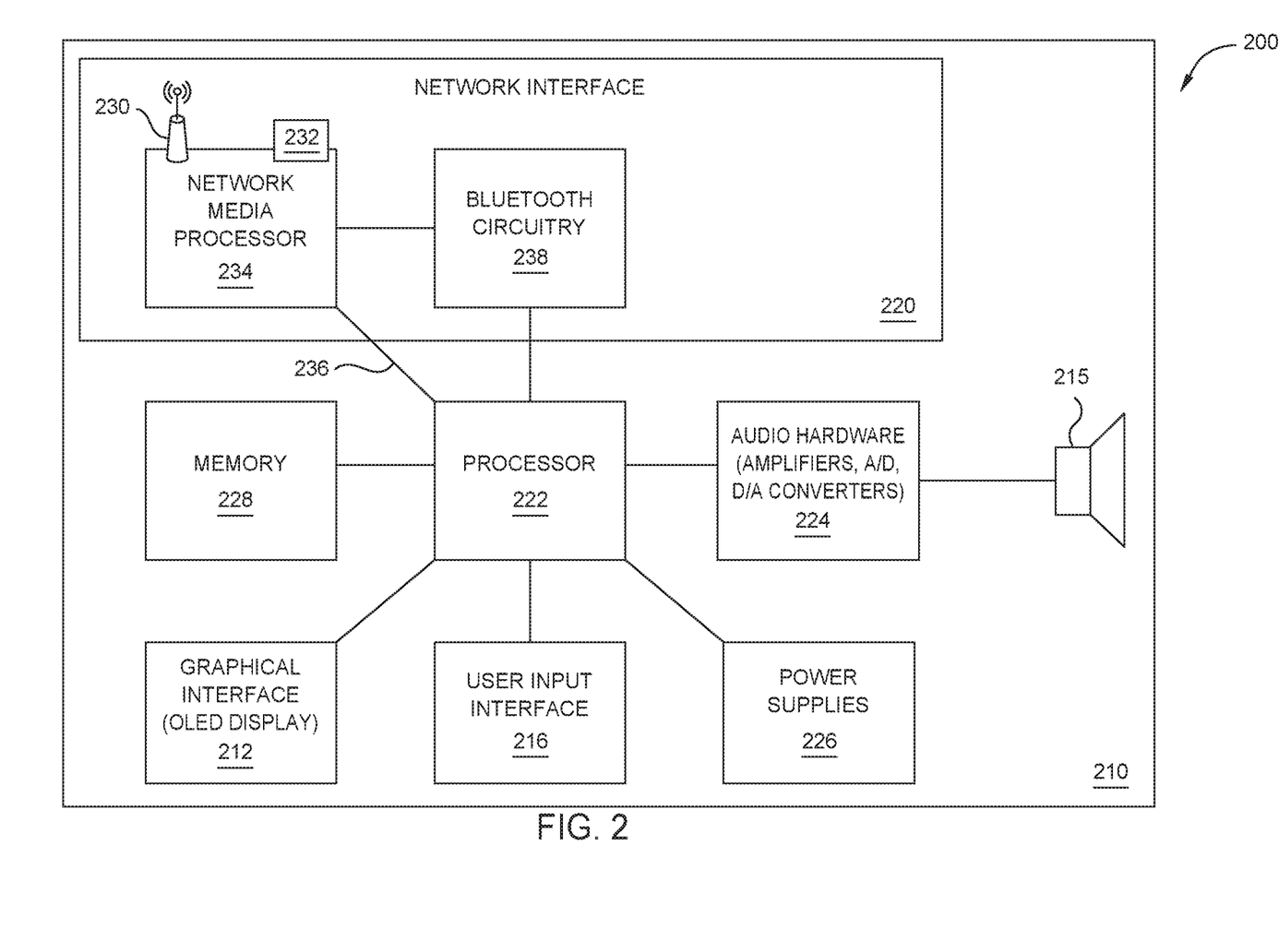
FIG. 2 illustrates an exemplary wireless speaker package, in accordance with certain aspects of the present disclosure.

FIG. 2 illustrates an exemplary wireless speaker package 200, in accordance with certain aspects of the present disclosure. As shown, the wireless speaker package 200 includes an enclosure 210. In the enclosure 210 resides an optional graphical interface 212 (e.g., an OLED display) which can provide the user with information regarding currently playing ("Now Playing") music. The speaker package 200 includes one or more electro-acoustic transducers 215 for outputting audio. Wireless speaker package device 200 also includes a user input interface 216. The user input interface 216 can include a plurality of preset indicators, which can be hardware buttons. The preset indicators can provide the user with easy, one press access to entities assigned to those buttons. The assigned entities can be associated with different ones of the digital audio sources such that a single wireless speaker package 200 can provide for single press access to various different digital audio sources.

Note that the present disclosure primarily describes the techniques described herein in the context of use with wireless speaker packages, for ease of description. However, in at least some implementations, the techniques described herein equally apply to wearable audio devices, such as an audio device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds, or sport headphones. However, a wearable audio device could be in other form factors, such as a headband, neckband, or glasses. A wearable audio device includes an acoustic driver to transduce audio signals to acoustic energy. The acoustic driver is housed in an earcup, in some implementations. In such implementations, each earcup may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset.

In addition, in at least some implementations, the techniques described herein equally apply to video devices, such as smartphones, tablet computers, laptop computers, desktop computers, smart televisions, and other computing devices or systems including a display. In such implementations that include devices having at least one display, the techniques can be used for synchronizing media data that includes at least video data, and optionally, audio data and/or image data. Therefore, the techniques described herein can assist with issues related to audio-to-video synchronization (which is also known as lip synchronization or lip sync error), as well as other challenges related to synchronizing video (and optionally, audio) playback.

Wireless speaker package 200 also includes a network interface 220, at least one processor 222, audio hardware 224, power supplies 226 for powering the various components of the speaker package 200, and memory 228. In an aspect, the processor 222, the graphical interface 212, the network interface 220, the audio hardware 224, the power supplies 226, and the memory 228 are interconnected using various buses, and several of the components can be mounted on a common motherboard or in other manners as appropriate.

The network interface 220 provides for communication between the wireless speaker package 200 and one or more audio sources and other wireless speaker packages including one or more networked wireless speaker packages and other audio playback devices via one or more communications protocols. The network interface 220 can provide either or both of a wireless interface 230 and a wired interface 232. The wireless interface 230 allows the wireless speaker package 200 to communicate wirelessly with other devices in accordance with a wireless communication protocol such as IEEE 802.11. The wired interface 232 provides network interface functions via a wired (e.g., Ethernet) connection.

In certain aspects, the network interface 220 can also include a network media processor 234 for supporting Apple AirPlay® and/or Apple Airplay® 2. For example, if a user connects an AirPlay® or Apple Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Apple Airplay® 2 and/or DLNA's UPnP protocols, and all integrated within one device.

All other digital audio received as part of network packets comes straight from the network media processor 234 through a USB bridge 236 to the processor 222 and runs into the decoders, DSP, and eventually is played back (rendered) via the electro-acoustic transducer(s) 215.

The network interface 220 can also include a Bluetooth circuitry 238 for Bluetooth applications (e.g., for wireless communication with a Bluetooth enabled audio source such as a smartphone or tablet) or other Bluetooth enabled speaker packages.

In an aspect, the network interface 220 supports communication with other devices using multiple communication protocols simultaneously at one time. For instance, the speaker package 210 can support Wi-Fi/Bluetooth coexistence and can support simultaneous communication using both Wi-Fi and Bluetooth protocols at one time. For example, the speaker package 210 can receive an audio stream from a smart phone using Bluetooth and can further simultaneously redistribute the audio stream to one or more other speakers over Wi-Fi. In an aspect, like most commercially available speaker packages, network interface 220 can include only one Radio Frequency (RF) Chain capable of communicating using only one communication method (e.g., Wi-Fi or Bluetooth) at one time. In this context, the network interface 220 may simultaneously support Wi-Fi and Bluetooth communications by time sharing the single RF chain between Wi-Fi and Bluetooth, for example, according to a time division multiplexing (TDM) pattern.

Streamed data passes from the network interface 220 to the processor 222. The processor 222 can execute instructions within the wireless speaker package (e.g., for performing, among other things, digital signal processing, decoding, and equalization functions), including instructions stored in the memory 228. The processor 222 can be implemented as a chipset of chips that includes separate and multiple analog and digital processors. The processor 222 can provide, for example, for coordination of other components of the audio speaker package 200, such as control of user interfaces, applications run by the audio playback device 200 and the like.

In certain aspects, the memory 228 stores software/firmware related to protocols and versions thereof used by the speaker package 200 for communicating with other networked speakers. For example the software/firmware governs how the speaker package 200 communicates with other speakers for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory can also store various codecs supported by the speaker package for audio playback of respective media formats. In an aspect, the software/firmware stored in the memory can be accessible and executable by the processor 222 for synchronized playback of audio with other networked speaker packages.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for sound output. In addition, the audio hardware 224 can include circuitry for processing analog input signals to provide digital audio signals for sharing with other devices, for example, other speaker packages for synchronized output of the digital audio.

The memory 228 can include, for example, flash memory and/or non-volatile random access memory (NVRAM). In some implementations, instructions (e.g., software) are stored in an information carrier. The instructions, when executed by one or more processing devices (e.g., the processor 222), perform one or more processes, such as those described elsewhere herein. The instructions can also be stored by one or more storage devices, such as one or more computer or machine-readable mediums (for example, the memory 228, or memory on the processor). The instructions can include instructions for performing decoding (i.e., the software modules include the audio codecs for decoding the digital audio streams), as well as digital signal processing and equalization.

As discussed above, aspects of the present disclosure discuss techniques for intelligent management of an operating band for a device. These aspects include techniques for intelligently selecting one or more communication modes and corresponding links for the device so as to not exceed a maximum number of communication modes and links that can be reliably supported by the device for the given operating band without compromising audio quality.

Figure 3:
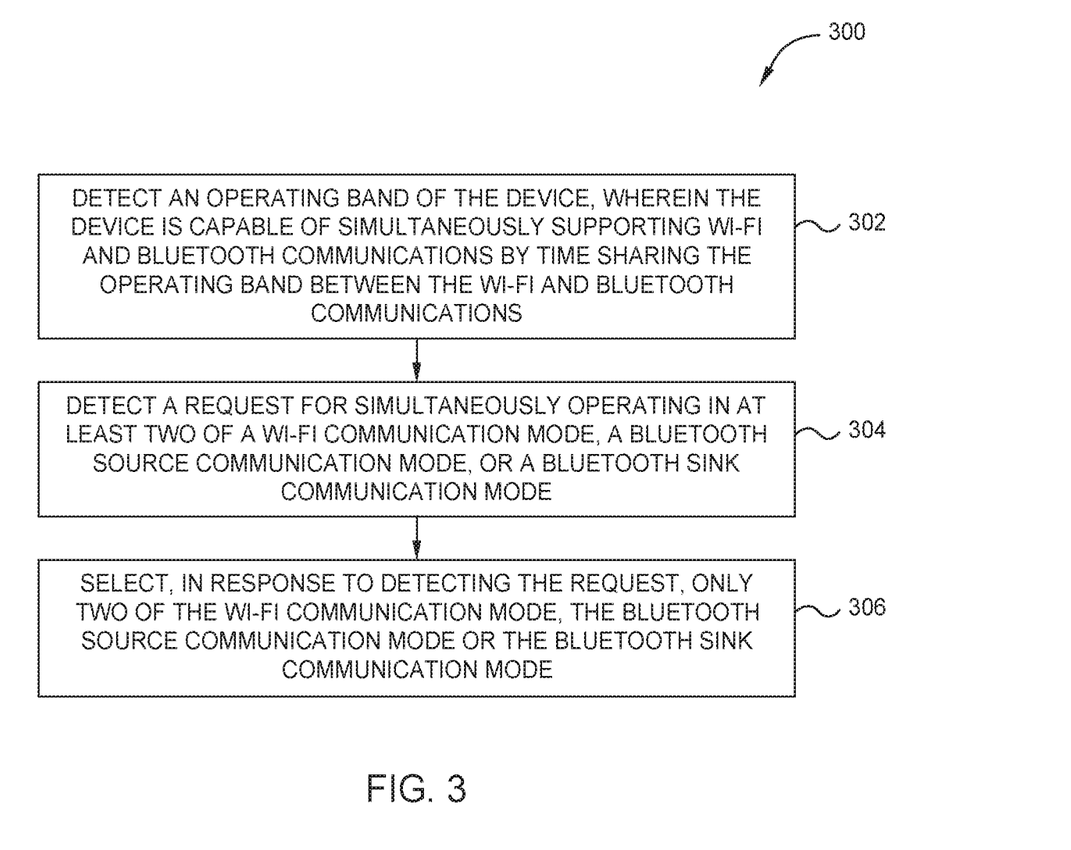
FIG. 3 illustrates example operations that can be performed by a device for managing access to an operating band of the device, in accordance with certain aspects of the present disclosure.

FIG. 3 illustrates example operations 300 that can be performed by a device (e.g., an audio output device 120, a computing device 140 and/or a digital audio/video device 146 as shown in FIG. 1) for managing access to an operating band of the device, in accordance with certain aspects of the present disclosure.

Operations 300 begin, at 302, by detecting an operating band of the device, wherein the device is capable of simultaneously supporting Wi-Fi and Bluetooth communications by time sharing the operating band between the Wi-Fi and Bluetooth communications.

At 304, the device detects a request for simultaneously operating in at least two of a Wi-Fi communication mode, a Bluetooth source communication mode, or a Bluetooth sink communication mode.

At 306, the device selects, in response to detecting the request, only two of the Wi-Fi communication mode, the Bluetooth source communication mode and the Bluetooth sink communication mode.

As noted above, the device is configured to transmit (e.g., an A2DP stream) as a Bluetooth source in the Bluetooth source communication mode, and is configured to receive (e.g., an A2DP stream) as a Bluetooth sink in the Bluetooth sink communication mode.

Most commercially available devices including audio input devices and audio output devices capable of wireless communication (e.g., Wi-Fi and/or Bluetooth communication) can generally operate at least in one of 2.4 GHz or 5 GHz operating bands.

In an aspect, it has been found that when operating at 2.4 GHz, approximately 50% of the air time is needed for reliable Wi-Fi communication between devices. Further, it has been found that approximately 50% of the air time is needed for reliable communication on a Bluetooth link in the Bluetooth source communication mode as well as the Bluetooth sink communication mode. Thus, at any given time a device operating at 2.4 GHz and that supports Wi-Fi/Bluetooth coexistence can simultaneously support only two of the Wi-Fi communication mode, the Bluetooth source communication mode and the Bluetooth sink communication mode. In most cases, unless Wi-Fi communication is disabled, Wi-Fi communications always occupy approximately 50% of the airtime even if a device is not actively transmitting or receiving data over the Wi-Fi link. For instance, even in the absence of active data communication, the Wi-Fi link is used for certain maintenance operations such as exchanging signaling between networked devices to keep them synchronized. Thus, a device operating in the 2.4 GHz band can practically support the Wi-Fi communication mode along with only one of the Bluetooth source mode and the Bluetooth sink mode. This means assuming the Wi-Fi link always occupies 50% of the air time operating at 2.4 GHz, the device additionally can either transmit as a Bluetooth source or receive as a Bluetooth sink but not both simultaneously. It may be noted that each Wi-Fi link or each Bluetooth link may not use exactly 50% of the airtime when operating in the 2.4 GHz band. In some implementations, a Wi-Fi link and/or a Bluetooth link can use a little less or a little more than 50% of the airtime, for example, with a margin of error of plus/minus 5%.

In certain aspects, a device operating in the 2.4 GHz band and that supports Wi-Fi/Bluetooth coexistence can be configured to select only two communication modes out of the Wi-Fi mode, Bluetooth source mode and Bluetooth sink mode.

In certain aspects, when the Wi-Fi communication is not disabled, the device can be configured to select between the Bluetooth source mode and the Bluetooth sink mode to occupy the remaining airtime not used by the Wi-Fi link.

Figure 4:
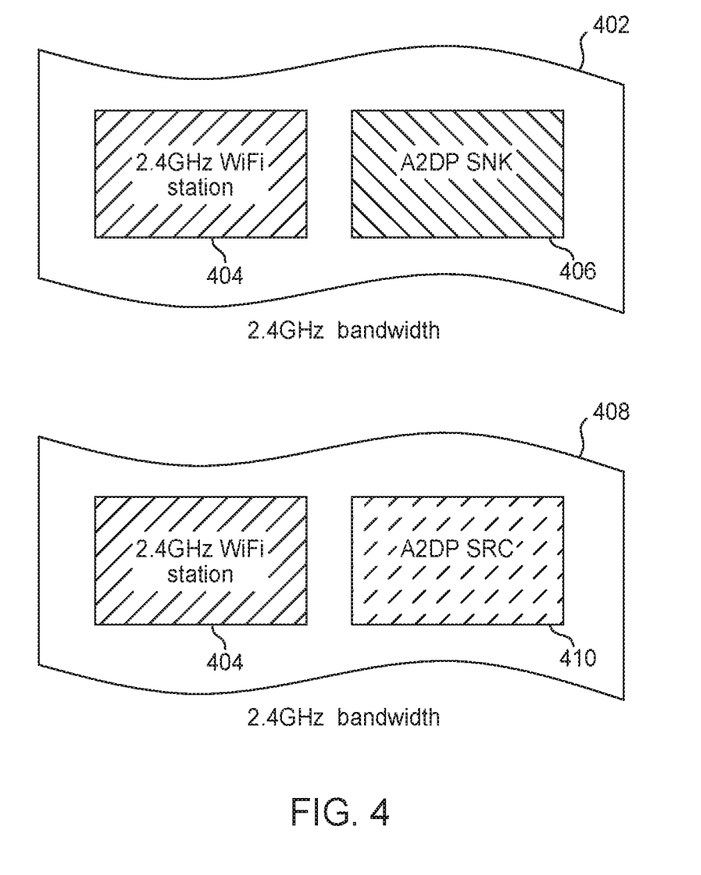
FIG. 4 illustrates the connectivity options when a device that supports Wi-Fi/Bluetooth coexistence is operating in a 2.4 GHz band, in accordance with certain aspects of the present disclosure.

FIG. 4 illustrates the connectivity options when a device that supports Wi-Fi/Bluetooth coexistence is operating in a 2.4 GHz band, in accordance with certain aspects of the present disclosure. As shown in FIG. 4, when Wi-Fi communication in the device is not disabled a portion of the link budget is allocated for Wi-Fi communication (shown as 2.4 GHz Wi-Fi station 404). As noted above, at approximately 50% of air time needs to be allocated for reliable Wi-Fi communication, in some implementations. As shown in FIG. 4 the remaining link budget can be allocated either for Bluetooth sink mode (represented as A2DP SNK in 406) as illustrated in example 402, or Bluetooth source mode (represented as A2DP SRC in 410) as illustrated in example 408. In some implementations, less than 50% of air time is used for Wi-Fi communication, regardless of reliability concerns. For instance, when a communication band (e.g., 2.4 GHz band) is being shared between Wi-Fi and Bluetooth communications, the band could be split such that anywhere from 30-70% is used for Wi-Fi communications and the remainder is used for Bluetooth communications.

Additionally, in some such implementations, a device can support only one Bluetooth link in either Bluetooth communication modes, each Bluetooth link corresponding to transmitting a single data stream or receiving a single data stream. This means the device, in addition to the Wi-Fi link, can support only one active Bluetooth reception link or one active Bluetooth reception link. For instance, the device cannot simultaneously receive more than one data stream or transmit more than one data stream, in some such implementations.

In certain aspects, various methods can be used for the selection between the communication modes and links. In an aspect, the selection between the two Bluetooth modes and/or a particular link of each Bluetooth mode can be driven by explicit user selection.

In an aspect, when a device that supports Wi-Fi/Bluetooth coexistence receives a request to simultaneously transmit on a first link as a Bluetooth source and receive as a Bluetooth sink, the device may present the user with a choice for selecting between the Bluetooth source and sink modes. This choice can be presented to the user via a user interface of the device, using a user device connected with the device such as a smart phone, or by any other known means. The user can select one of the Bluetooth source or sink modes link based on his/her preference.

For example, when a device (e.g., AV receiver, sound bar etc.) is receiving an A2DP stream over a Bluetooth link and is redistributing the audio stream to other networked speakers over Wi-Fi, and when the device receives a further request to transmit the audio stream to a Bluetooth headphone, the device cannot simultaneously support receiving the audio stream as a Bluetooth sink and transmitting the audio stream as a Bluetooth source. In this case, the user can be presented with the choice to select between the two Bluetooth links. In this example, the user may choose to drop the new request to transmit the audio stream to the Bluetooth headphone. In another example, the new request can be a request to simultaneously receive another audio stream. In this example, the device has two different requests to receive data on two different Bluetooth links. However, as noted above, the device can support only one Bluetooth link at a time and selects between the two Bluetooth stream, for example, based on user selection.

In an aspect, the device can automatically select the communication mode based on pre-configured default settings, customized user preferences set by the user, or a combination thereof. For example, the device by default can be configured to select a link corresponding to the most recent request and drop a link corresponding to the oldest request.

In certain aspects, when Wi-Fi is disabled, the device can support a total of two Bluetooth links simultaneously as each Bluetooth link requires approximately 50% of the airtime for reliable communication. For instance, the device can simultaneously support one link in the Bluetooth source mode and one link in the Bluetooth sink mode, or two links in either of the Bluetooth communication modes. In this context, any one or more of the selection methods discussed above can be used for selecting two Bluetooth links.

Figure 5:
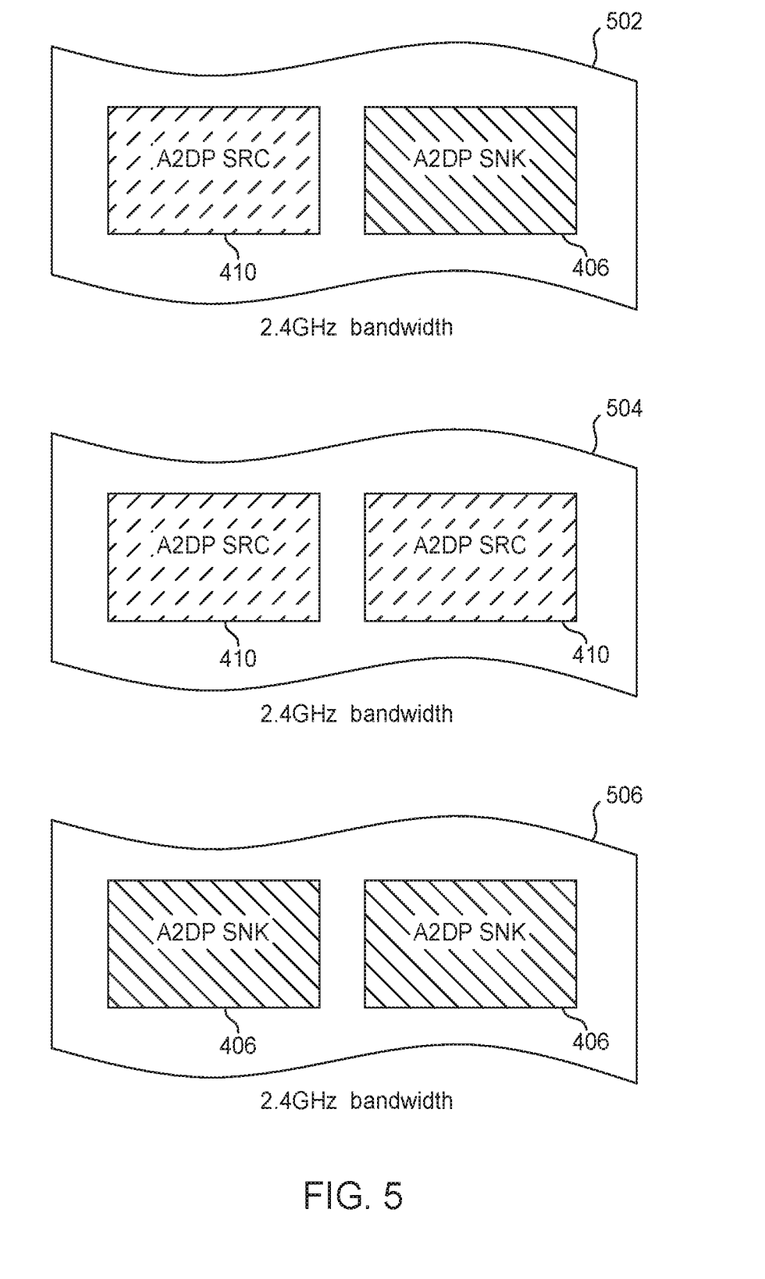
FIG. 5 illustrates the connectivity options when a device that supports Wi-Fi/Bluetooth coexistence is operating in a 2.4 GHz band and Wi-Fi communication is disabled, in accordance with certain aspects of the present disclosure.

FIG. 5 illustrates the connectivity options when a device that supports Wi-Fi/Bluetooth coexistence is operating in a 2.4 GHz band and Wi-Fi communication is disabled, in accordance with certain aspects of the present disclosure. As shown in FIG. 5, when Wi-Fi communication in the device is disabled, the entire link budget can be allocated for Bluetooth communication. As noted above, each Bluetooth link (Bluetooth source link or Bluetooth sink link) needs to be allocated at least approximately 50% of air time for reliable Bluetooth communication. As shown in FIG. 5, the device can select one link in the Bluetooth source mode and one link in the Bluetooth sink mode (as illustrated in example 502), can select two links in the Bluetooth source mode (as illustrated in example 504), or can select two links in the Bluetooth sink mode (as illustrated in example 506).

In certain aspects, when a device that supports Wi-Fi/Bluetooth coexistence is operating in a 5 GHz band, the 2.4 GHz band can be exclusively allocated for Bluetooth communication. Thus, in this context, similar to the case when Wi-Fi mode is disabled for a device operating at 2.4 GHz, the device can support two different Bluetooth links. For example, the device can simultaneously support one link in the Bluetooth source mode and one link in the Bluetooth sink mode, or two links in either of the Bluetooth communication modes. In other words, in some implementations, such as when Wi-Fi communication is operating on the 5 GHz band, a device can simultaneously support Wi-Fi communication (e.g., for media data transmission and/or reception), Bluetooth source communication (e.g., for media data transmission), and Bluetooth sink communication (e.g., for media data reception).

In certain aspects, a device can provide the user information regarding why the device is switching links and which link is being dropped in favor of which link. For example, when the device receives requests for more Bluetooth connections than the device can reliable handle, the device selects a set of links that it can reliably handle and provides the user with information relating to the selection. The information may be provided to the user by way of a pop up on a user interface screen of the device or some other known means.

Numerous different combinations of Wi-Fi and Bluetooth (BT) communication coexistence is possible using the techniques described herein. For instance, below is a table that provides possible examples of band time sharing, where in some implementations, the percentages listed are exact, while in other implementations, the percentages listed include a margin of error of plus/minus 5%. Note that the percentages listed in the table below can relate to over air time percentage on the listed band and/or band link budget. Also note that where Wi-Fi communication is operating on the 5 GHz band (or generally, on a different band than Bluetooth communication), then it could use up to 100% of that band.

| Wi-Fi Band: 2.4 or 5 GHz? | Wi-Fi 2.4 GHz Band Percentage | BT Sink 2.4 GHz Band Percentage | BT Source 2.4 GHz Band Percentage |
|---|---|---|---|
| 2.4 GHz | 50% | 50% | 0% |
| 2.4 GHz | 50% | 0% | 50% |
| 2.4 GHz | 0% | 50% | 50% |
| 2.4 GHz | 40% | 60% | 0% |
| 2.4 GHz | 60% | 40% | 0% |
| 2.4 GHz | 40% | 0% | 60% |
| 2.4 GHz | 60% | 0% | 40% |
| 2.4 GHz | 0% | 60% | 40% |
| 2.4 GHz | 0% | 40% | 60% |
| 2.4 GHz | 33% | 33% | 33% |
| 5 GHz | 0% | 50% | 50% |
| 5 GHz | 0% | 40% | 60% |
| 5 GHz | 0% | 60% | 40% |

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for managing a number of active wireless data streams in a device, comprising:
    detecting an operating band of the device, wherein the device is capable of simultaneously supporting Wi-Fi and Bluetooth communications by time sharing the operating band between the Wi-Fi and Bluetooth communications;
    detecting a request for simultaneously operating in at least two of a Wi-Fi communication mode, a Bluetooth source communication mode, or a Bluetooth sink communication mode; and
    selecting, in response to detecting the request, only two of the Wi-Fi communication mode, the Bluetooth source communication mode, or the Bluetooth sink communication mode.

2. The method of claim 1, further comprising:
    allocating a portion of time for the time sharing for the Wi-Fi communication mode; and
    allocating a remaining portion of the time for one of the Bluetooth source communication mode or the Bluetooth sink communication mode.

3. The method of claim 2, wherein the selecting comprises:
    selecting the Wi-Fi communication mode; and
    selecting one of the Bluetooth source communication mode or the Bluetooth sink communication mode, wherein at least one of the Bluetooth source communication mode or the Bluetooth sink communication mode is an unselected Bluetooth communication mode.

4. The method of claim 3, further comprising:
    detecting a request for the unselected Bluetooth communication mode.

5. The method of claim 4, further comprising:
    dropping the selected one of the Bluetooth source communication mode or the Bluetooth sink communication mode; and
    selecting the unselected Bluetooth communication mode.

6. The method of claim 4, further comprising:
    determining whether to drop the selected one of the Bluetooth source communication mode or the Bluetooth sink communication mode based on user preferences.

7. The method of claim 1, further comprising:
    detecting that the Wi-Fi communication has switched to a second operating band, such that all three of the Wi-Fi communication mode, the Bluetooth source communication mode, and the Bluetooth sink communication mode can be simultaneously supported; and
    in response, selecting all three of the Wi-Fi communication mode, the Bluetooth source communication mode, and the Bluetooth sink communication mode.

8. The method of claim 1, further comprising:
    detecting that the Wi-Fi communication mode is disabled; and in response, selecting both the Bluetooth source communication mode and the Bluetooth sink communication mode.

9. The method of claim 1, wherein the operating band is 2.4 gigahertz (GHz).

10. An apparatus for managing a number of active wireless data streams in a device, comprising:
at least one processor configured to:
detect an operating band of the device, wherein the device is capable of simultaneously supporting Wi-Fi and Bluetooth communications by time sharing the operating band between the Wi-Fi and Bluetooth communications;
detect a request for simultaneously operating in at least two of a Wi-Fi communication mode, a Bluetooth source communication mode, or a Bluetooth sink communication mode; and
select, in response to detecting the request, only two of the Wi-Fi communication mode, the Bluetooth source communication mode, or the Bluetooth sink communication mode.

11. The apparatus of claim 10, wherein the at least one processor is further configured to:
allocate a portion of time for the time sharing for the Wi-Fi communication mode; and
allocate a remaining portion of the time for one of the Bluetooth source communication mode or the Bluetooth sink communication mode.

12. The apparatus of claim 11, wherein the at least one processor is configured to perform the selecting by:
selecting the Wi-Fi communication mode; and
selecting one of the Bluetooth source communication mode or the Bluetooth sink communication mode, wherein at least one of the Bluetooth source communication mode or the Bluetooth sink communication mode is an unselected Bluetooth communication mode.

13. The apparatus of claim 12, wherein the at least one processor is further configured to:
detect a request for the unselected Bluetooth communication mode.

14. The apparatus of claim 13, wherein the at least one processor is further configured to:
drop the selected one of the Bluetooth source communication mode or the Bluetooth sink communication mode; and
select the unselected Bluetooth communication mode.

15. The apparatus of claim 13, wherein the at least one processor is further configured to:
determine whether to drop the selected one of the Bluetooth source communication mode or the Bluetooth sink communication mode based on user preferences.

16. The apparatus of claim 10, wherein the at least one processor is further configured to:
detect that the Wi-Fi communication has switched to a second operating band, such that all three of the Wi-Fi communication mode, the Bluetooth source communication mode and the Bluetooth sink communication mode can be simultaneously supported; and
in response, select all three of the Wi-Fi communication mode, the Bluetooth source communication mode and the Bluetooth sink communication mode.

17. The apparatus of claim 10, wherein the at least one processor is further configured to:
detect that the Wi-Fi communication mode is disabled; and
in response, select both the Bluetooth source communication mode and the Bluetooth sink communication mode.

18. A non-transitory computer-readable medium for managing a number of active wireless data streams in a device, the computer-readable medium storing instructions which when processed by at least one processor performs a method comprising:
detecting an operating band of the device, wherein the device is capable of simultaneously supporting Wi-Fi and Bluetooth communications by time sharing the operating band between the Wi-Fi and Bluetooth communications;
detecting a request for simultaneously operating in at least two of a Wi-Fi communication mode, a Bluetooth source communication mode, or a Bluetooth sink communication mode; and
selecting, in response to detecting the request, only two of the Wi-Fi communication mode, the Bluetooth source communication mode, or the Bluetooth sink communication mode.

19. The non-transitory computer-readable medium of claim 18, further comprising instructions for:
allocating a portion of time for the time sharing for the Wi-Fi communication mode; and
allocating a remaining portion of the time for one of the Bluetooth source communication mode or the Bluetooth sink communication mode.

20. The non-transitory computer-readable medium of claim 19, wherein the selecting comprises:
selecting the Wi-Fi communication mode; and
selecting one of the Bluetooth source communication mode or the Bluetooth sink communication mode, wherein at least one of the Bluetooth source communication mode or the Bluetooth sink communication mode is an unselected Bluetooth communication mode.

* * * * *